United States Patent
Asher

(10) Patent No.: US 10,053,781 B2
(45) Date of Patent: Aug. 21, 2018

(54) SOLID STATE INHIBITOR FOR PIPELINE AND FLOWLINE APPLICATIONS

(71) Applicant: Stefanie Lynn Asher, Spring, TX (US)

(72) Inventor: Stefanie Lynn Asher, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 141 days.

(21) Appl. No.: 14/867,032

(22) Filed: Sep. 28, 2015

(65) Prior Publication Data

US 2016/0161041 A1    Jun. 9, 2016

Related U.S. Application Data

(60) Provisional application No. 62/087,451, filed on Dec. 4, 2014.

(51) Int. Cl.
  *C23F 11/08*  (2006.01)
  *C23F 11/00*  (2006.01)
  *F16L 58/00*  (2006.01)

(52) U.S. Cl.
  CPC .............. *C23F 11/08* (2013.01); *C23F 11/00* (2013.01); *F16L 58/00* (2013.01)

(58) Field of Classification Search
  CPC .................................. F16L 58/00; C23F 11/08
  USPC ....................................................... 428/35.2
  See application file for complete search history.

(56) References Cited

U.S. PATENT DOCUMENTS

| | | | | |
|---|---|---|---|---|
| 5,078,301 A | * | 1/1992 | Gladfelter | A47L 15/4436 222/52 |
| 6,287,466 B1 | * | 9/2001 | Yassin | C02F 1/688 137/268 |
| 6,649,050 B1 | * | 11/2003 | Cerny | C02F 1/688 137/268 |
| 7,524,434 B2 | * | 4/2009 | Blakemore | C09K 5/10 165/900 |
| 7,833,947 B1 | | 11/2010 | Kubala | |
| 8,465,198 B2 | | 6/2013 | Hassan et al. | |
| 2004/0115378 A1 | | 6/2004 | Dunaway et al. | |
| 2012/0091396 A1 | | 4/2012 | Dunaway et al. | |
| 2013/0130961 A1 | | 5/2013 | Fan et al. | |
| 2014/0296185 A1 | | 10/2014 | Jones et al. | |

FOREIGN PATENT DOCUMENTS

WO    WO 2007/035107    3/2007

* cited by examiner

*Primary Examiner* — Kevin Joyner
(74) *Attorney, Agent, or Firm* — ExxonMobil Upstream Research Company-Law Department

(57) ABSTRACT

A system for inhibiting the corrosion of pipelines and flowlines. The system includes a solid formulation comprising a corrosion inhibitor; a container structured and arranged to permit the flow of fluids therethrough and confine the solid formulation; and a module structured and arranged to position the container within a flowpath of the pipeline or flowline and maintain its axial position. A method of inhibiting the corrosion of pipelines and flowlines and an apparatus for inhibiting the corrosion of pipelines and flowlines are also provided.

12 Claims, 5 Drawing Sheets

SOLID STATE INHIBITOR FOR PIPELINE AND FLOWLINE APPLICATIONS

CROSS-REFERENCE TO RELATED APPLICATION

This application claims the priority benefit of U.S. Provisional Patent Application No. 62/087,451, filed Dec. 4, 2014, entitled SOLID STATE INHIBITOR FOR PIPELINE AND FLOWLINE APPLICATIONS, the entirety of which is incorporated by reference herein.

FIELD

The present disclosure relates to an apparatus for inhibiting the corrosion of pipelines and flowlines and systems and methods employing same.

BACKGROUND

In order to protect the integrity of pipelines and flowlines from internal corrosion, corrosion inhibitors are injected. Corrosion inhibitors include any chemical component that, when present in small quantities, produces a reduction in the metal loss of a structure due to corrosion. Corrosion inhibitors are generally organic molecules that accumulate at the metal/solution interface to impede the interaction of water and corrosive components with the metal surface.

Currently, corrosion inhibitors are added to pipelines and flowlines in a liquid mixture. The mixture is composed of several components including: an active component; a solvent, which is used to improve the physical characteristics, such as viscosity, free protection, etc.; a co-solvent, which is used to achieve product stability; a surfactant, which is used to control dispersibility of the chemical in the fluid; and specialty chemicals, such as a demulsifying agent, an anti-foaming agent, etc.

Corrosion inhibitors are introduced to the pipelines and flowlines in one of two methods: continuous injection or batch flow. In a continuous application, the inhibitor is continuously injected in small dosages into the pipeline/flowline Inhibitors are typically stored in tanks or vessels at the inlet of the pipeline and utilize a pump to meter and inject the chemical inhibitor.

In batch flow, the inhibitor chemical is delivered by a slug of a large volume of the chemical pushed through the line. Batches can be accomplished with the assistance of pigs. Fluid can either be pushed in front of a pig or transported between two pigs. These batches need to occur at a predetermined frequency in order to maintain a sufficient amount of chemical at the pipe/fluid interface. Frequency is determined based on: the liquid entry into a pipe, the liquid holdup in the pipe, the size of the slug catcher; the impact of the slug on facilities; the slug size and pipeline inventory; and the amount of debris found in the pig receiver.

A batch flow operation requires the pipeline to be pigged. Pigging can be challenging due to the operational conditions of the pipeline or flowline. Pigging challenges include but are not limited to: the existence of a high flow rate; the existence of a low flow rate; the lack of a pig launcher; the lack of a pig receiver; the existence of a multi-diameter pipeline; an acid and/or gas environment; the existence of barred tees; and the existence of an unpiggable wye joint.

If the batch is not run at the required frequency, the pipeline is at risk for an under dosage of chemicals. The frequency of dosage is also challenging, since it is difficult to account for changing conditions of the pipeline or flowline with age. Moreover, the increase in solids (e.g. sand, wax) will reduce the effectiveness of inhibitors.

The use of liquid corrosion inhibitors requires tanks and facilities to ensure that the pipeline is constantly supplied with the required volume of chemical corrosion inhibitor. The tanks must be maintained and kept full in order to maintain availability of the chemical. Maintaining chemicals at the inlet facility can be challenging at remote locations and offshore locations. Additionally, the injection pump is critical to the functionality of the inhibitor process. Any disruption to injection will lead to a decrease in the inhibitor's effectiveness. In order to be cost effective, continuous injection quantities employed often do not significantly exceed the minimum required in order to maintain protection, while the timing of batch inhibitors is designed to maintain the minimum dosage required. Therefore, any disruption to the injection due to equipment malfunction or chemical availability can lead to risk of corrosion.

Furthermore, as oil and gas operations expand to more remote locations, such as the arctic, delivery of liquid inhibitor can be very challenging. A supply may only be delivered once or twice a year. Therefore, large quantities that are easy to ship and store are required. Several components of the liquid inhibitor can pose health and safety challenges. For example, most liquid inhibitors are based on a methanol solvent, making them highly flammable. Additionally, the handling, transportation, and storage of these chemicals can pose risks to site personnel. An inhibitor in a solid form would be easier to handle, store, and manage at these locations.

Additionally, liquid inhibitors are limited to applications having fluid flows. Pipeline and flowlines with bathymetry that include dead-legs pose additional risks for corrosion when not supplied with the appropriate concentration of liquid corrosion inhibitor.

As such, there is a desire for an alternative solution for pipeline and flowline corrosion inhibition that addresses the aforementioned problems.

SUMMARY

In one aspect, disclosed herein is a system for inhibiting the corrosion of pipelines and flowlines. The system includes a solid formulation comprising a corrosion inhibitor; a container structured and arranged to permit the flow of fluids therethrough and confine the solid formulation; and a module structured and arranged to position the container within a flowpath of the pipeline or flowline and maintain its axial position.

In some embodiments, the module is in the form of a pipeline valve body housing.

In another aspect, disclosed herein is a method of inhibiting the corrosion of pipelines and flowlines. The method includes: installing a container having a solid formulation confined within, the solid formulation comprising a corrosion inhibitor, the container structured and arranged to permit the flow of fluids therethrough; placing the container within a flowpath of the pipeline or flowline at an axial position within the pipeline or flowline; and maintaining the axial position of the container along the pipeline or flowline.

In some embodiments, the method further comprises forming a solid formulation by preparing a composition comprising a binding agent and a corrosion inhibitor, mixing the composition, pouring the composition into a mold, and allowing the composition to solidify at ambient temperature.

In some embodiments, maintaining the axial position of the container along the pipeline or flowline includes installing a module in the form of a pipeline valve body housing into the pipeline or flowline.

In yet another aspect, disclosed herein is an apparatus for inhibiting the corrosion of pipelines and flowlines. The apparatus includes a solid formulation comprising a corrosion inhibitor; and a container structured and arranged to permit the flow of fluids therethrough and confine the solid formulation.

In some embodiments, the corrosion inhibitor is selected from amines, ammonium salts, amides, imidazolines, quaternary amines, esters, and mixtures thereof In some embodiments, the corrosion inhibitor is selected on the basis of environmental conditions and water content of a production stream.

In some embodiments, the corrosion inhibitor is functional over a temperature range of about −51° C. to about 93° C. (about −60° F. to about 200° F.).

In some embodiments, the solid formulation further comprises a binding agent to contain the corrosion inhibitor in a solid form.

In some embodiments, the binding agent is selected from alkali metal salts, $C_{16}$-$C_{24}$ fatty alcohols, $C_{16}$-$C_{24}$ fatty alcohol ethoxylates, fatty acid alkanolamides, fatty acids, natural waxes and resins, high molecular weight polyethylene glycols, polyethylene waxes, mineral and petrolatum waxes, microcrystalline waxes, and mixtures thereof In some embodiments, the solid formulation further comprises one or more biocides, anti-foamers, scale inhibitors, hydrate inhibitors, scavengers, and mixtures thereof.

In some embodiments, the solid formulation has increased surface area to increase diffusivity. In some embodiments, the solid formulation is perforated to increase diffusivity.

In some embodiments, the container is in the form of a wire cage.

In some embodiments, the apparatus further includes a module in the form of a pipeline valve body housing for maintaining the axial position of the container along the pipeline or flowline.

DETAILED DESCRIPTION

FIGS. 1 through 5 provide illustrative, non-exclusive examples relating to a system, method, and apparatus for inhibiting the corrosion of pipelines and flowlines, according to the present disclosure, together with elements that may include, be associated with, be operatively attached to, and/or utilize such a system, method, or apparatus.

In FIGS. 1 through 5, like numerals denote like, or similar, structures and/or features; and each of the illustrated structures and/or features may not be discussed in detail herein with reference to the figures. Similarly, each structure and/or feature may not be explicitly labeled in the figures, and any structure and/or feature that is discussed herein with reference to the figures may be utilized with any other structure and/or feature without departing from the scope of the present disclosure.

In general, structures and/or features that are, or are likely to be, included in a given embodiment are indicated in solid lines in the figures, while optional structures and/or features are indicated in broken lines. However, a given embodiment is not required to include all structures and/or features that are illustrated in solid lines therein, and any suitable number of such structures and/or features may be omitted from a given embodiment without departing from the scope of the present disclosure.

As used herein, "corrosion" refers to the reaction of an engineering metal with its environment with a consequent deterioration in properties of the metal. In other words, corrosion can be defined as the chemical reaction between a metal surface and its environment.

Figure 1:
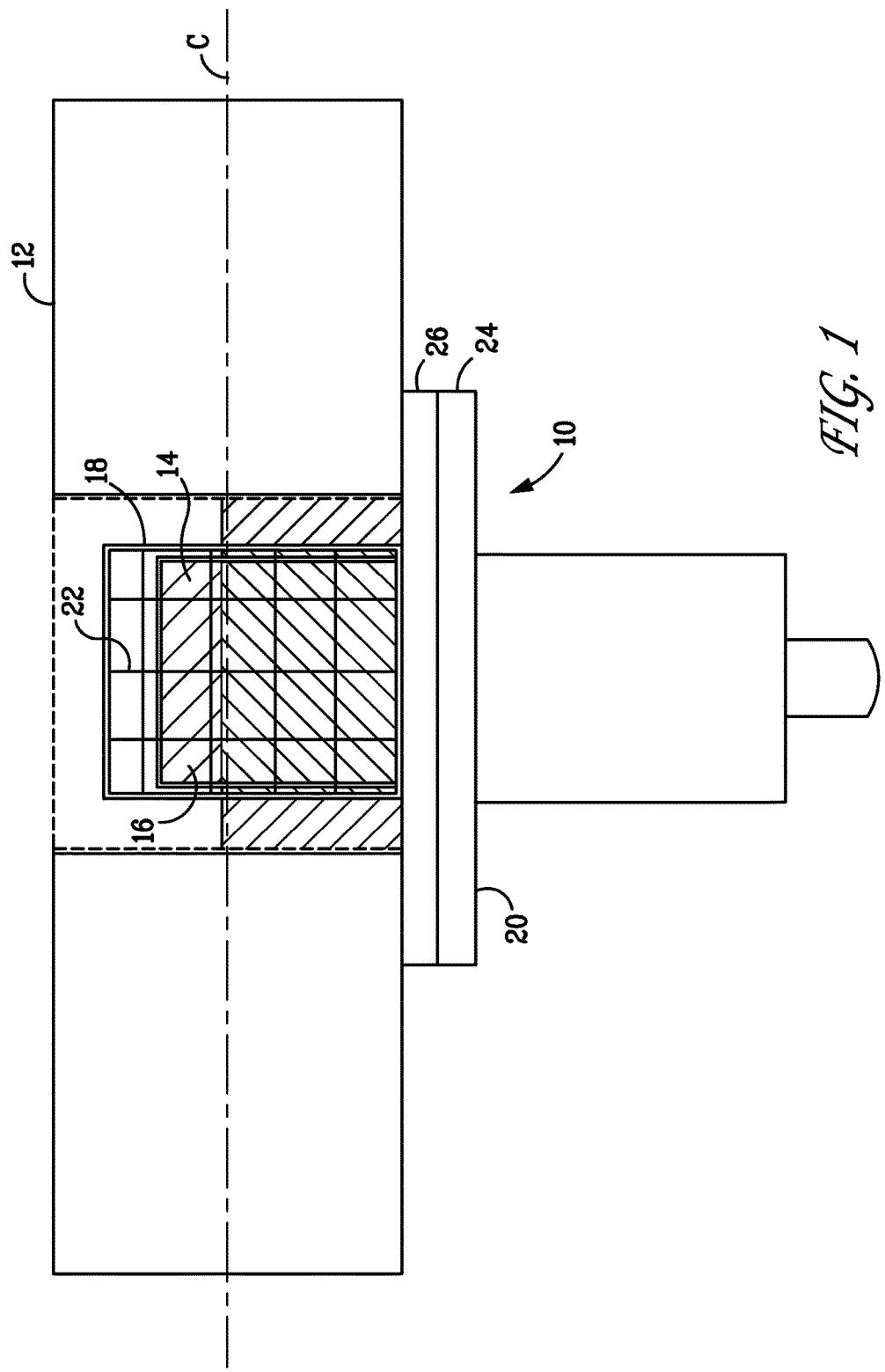
FIG. 1 presents a schematic illustration, in partial cutaway, of a solid corrosion inhibitor held within a container, the solid corrosion inhibitor in the form of a solid block, in accordance with the present disclosure.

Referring now to FIG. 1, illustrated is one embodiment of a system 10 for inhibiting the corrosion of pipelines 12 and flowlines (not shown). The system 10 includes a solid formulation 14 comprising a corrosion inhibitor 16. Solid formulation 14 may be housed within a container 18, container 18 structured and arranged to permit the flow of fluids therethrough and confine the solid formulation 14.

In some embodiments, system 10 may also include a module 20. Module 20 is structured and arranged to position the container 18 within a flowpath of the pipeline 12 or flowline and maintain its axial positioning C. Module 20 may be converted from a pipeline valve body housing, as shown, or designed and constructed as a specific unit that may be installed in place of a valve body housing in a pipeline 12 or flowline. Module 20 is provided with a module mounting flange 24, which may be mounted to pipeline surface flange 26 of pipeline 12.

While container 18 may be provided in any number of suitable configurations, in one embodiment, the container 18 may be provided in the form of a wire cage 22. Other forms are contemplated and are within the scope of the present disclosure. Such other embodiments can include a metal box (not shown) having a plurality of holes positioned therethrough to permit the flow of fluids therethrough and confine the solid formulation 14. The metal box (not shown) may be formed from sheet metal or a casting, as those skilled in the art will plainly recognize.

Figure 2:
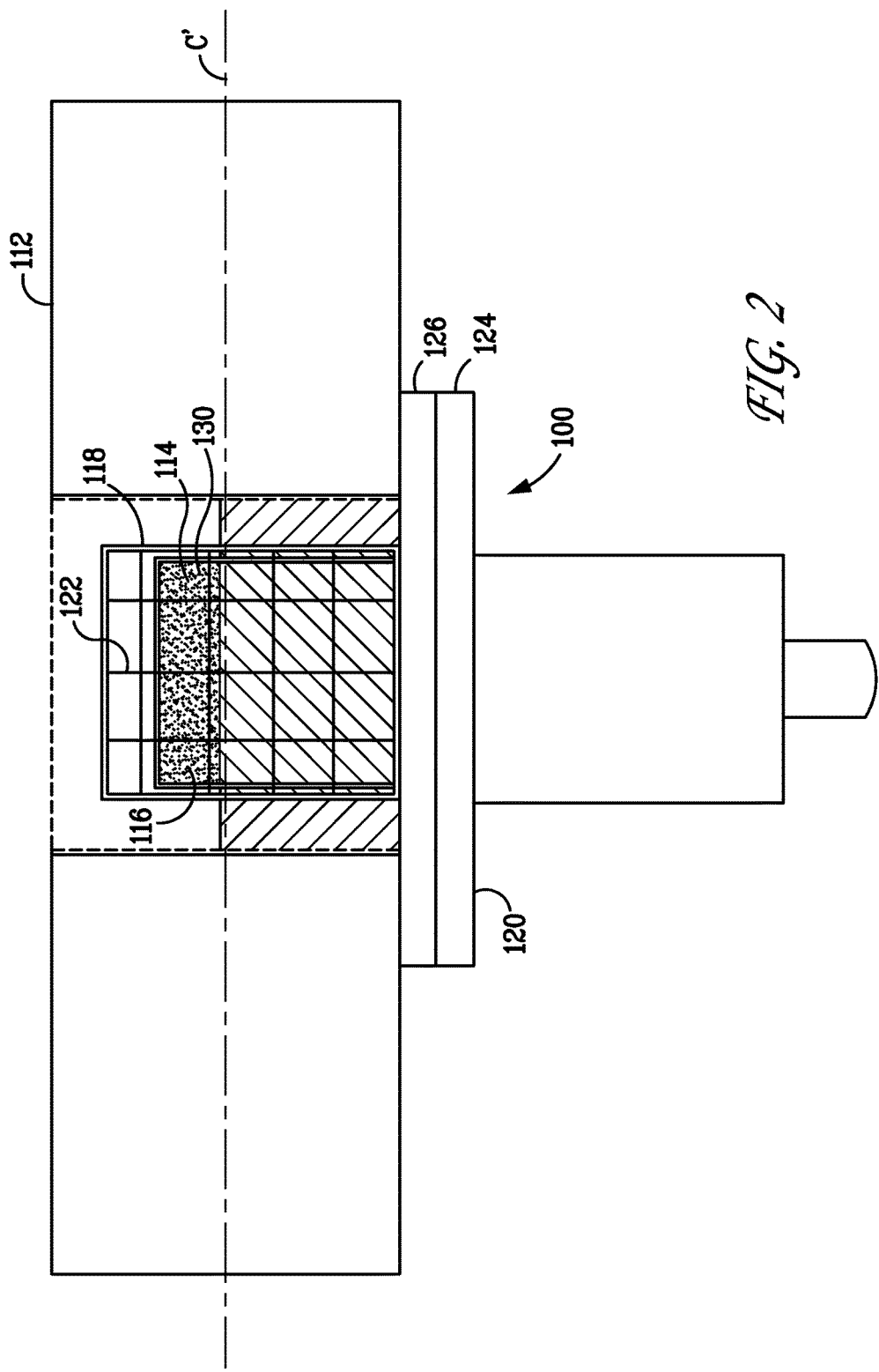
FIG. 2 presents a schematic illustration, in partial cutaway, of a solid corrosion inhibitor held within a container, the solid corrosion inhibitor in the form of a perforated block, in accordance with the present disclosure.

Referring now to FIG. 2, illustrated is another embodiment of a system 100 for inhibiting the corrosion of pipelines 112 and flowlines (not shown). The system 100 includes a solid formulation 114 comprising a corrosion inhibitor 116. Solid formulation 114 may be housed within a container 118, container 118 structured and arranged to permit the flow of fluids therethrough and confine the solid formulation 114.

In some embodiments, system 100 may also include a module 120. Module 120 is structured and arranged to position the container 118 within a flowpath of the pipeline 112 or flowline and maintain its axial positioning C'. Module 120 may be converted from a pipeline valve body housing, as shown, or designed and constructed as a specific unit that may be installed in place of a valve body housing in a pipeline 112 or flowline. Module 120 is provided with a module mounting flange 124, which may be mounted to pipeline surface flange 126 of pipeline 112.

While container 118 may be provided in any number of suitable configurations, in one embodiment, the container 118 may be provided in the form of a wire cage 122. Other forms are contemplated and are within the scope of the present disclosure. Such other embodiments can include a metal box (not shown) having a plurality of holes positioned therethrough to permit the flow of fluids therethrough and confine the solid formulation 114. The metal box (not shown) may be formed from sheet metal or a casting, as those skilled in the art will plainly recognize.

The corrosion inhibitor of the solid formulation may be selected from a wide variety of efficacious compounds, including amines, ammonium salts, amides, imidazolines, quaternary amines, esters, and mixtures thereof Advantageously, the corrosion inhibitor may be selected on the basis of environmental conditions and the water content of a production stream. The corrosion inhibitor may be selected to be effective over a temperature range of about −51° C. to about 93° C. (about −60° F. to about 200° F.), about −34° C. to about 66 ° C. (about −30° F. to about 150° F.), or about −18° C. to about 38° C. (about 0° F. to about 100° F.), as the case may be.

The solid formulation has the ability to deliver a highly active, solid particulate corrosion inhibitor in a solid medium, such as a non-aqueous matrix or binding agent. As may be appreciated, the corrosion inhibitor should produce a homogeneous dispersion of the primary corrosion inhibitor in the solid formulation. The binding agent can be selected so as to be compatible with a variety of ingredients and easily adapted to a wide range of oilfield applications where pipeline and flowline corrosion may be an issue.

The binding agent may be present at levels that impart desirable characteristics, such as dissolution rate and overall strength. Moreover, the binding agent should be selected so as to impart little to no detrimental effect on the overall performance of the corrosion inhibitor. To measure the strength and hardness of the solid formulation, ASTM D1321-10, "Standard Test Method for Needle Penetration of Petroleum Waxes," may be employed. The crystallization structure of the binding agent may be selected to achieve a desired dissolution rate.

In some embodiments, the binding agent may be selected from alkali metal salts; fatty alcohols; $C_{16}$-$C_{24}$ fatty alcohol ethoxylates; fatty acid alkanolamides; fatty acids; natural waxes and resins, in particular vegetable waxes; high molecular weight polyethylene glycols; polyethylene waxes; mineral and petrolatum waxes; microcrystalline waxes; and mixtures thereof.

In some embodiments, the binding agent may be selected from high molecular weight polyethylene glycols. In particular, these polyethylene glycols are chosen from PEG 1500, PEG 3000, or PEG 4000, available from BASF, or Carbowax®, available from Dow Chemicals. The melting point and mechanical strength imparted by the glycol can be further manipulated by the inclusion of lower molecular weight polymers, e.g., PEG 200-1000. The inclusion of lower molecular weight homologues lowers the melting point of the formulation and therefore aids its dissolution.

The binding agent may also be chosen from microcrystalline waxes (petrolatum). In such an embodiment, the wax forms small crystals, which will facilitate the dissolution and control the release of the active, solid particulate corrosion inhibitor as it melts.

In some embodiments, the binding agent is a fatty acid alkanolamide, such as lauric monoethanolamide, or a high molecular weight polyethylene glycol. In some embodiments, the solid formulation may also comprise a natural wax, such as vegetable wax, in particular rapeseed wax.

In some embodiments, the binding agent is present at a level of 1-60% w/w of the solid formulation.

To address other issues that may be present in a particular pipeline or flowline, in some embodiments, the solid formulation further comprises one or more biocides, antifoamers, scale inhibitors, hydrate inhibitors, scavengers, and mixtures thereof Referring again to FIG. 2, in some embodiments, the solid formulation 114 may have increased surface area to increase diffusivity. As may be appreciated, the surface area of the solid formulation 114 may be increased by increasing the porosity of the solid formulation, molding the solid formulation to include a plurality of passageways or channels, perforating the solid formulation, or the like. In one embodiment, the solid formulation 114 may include perforations 130 to increase diffusivity. This can be particularly beneficial in environments with limited or no flow.

Figure 3:
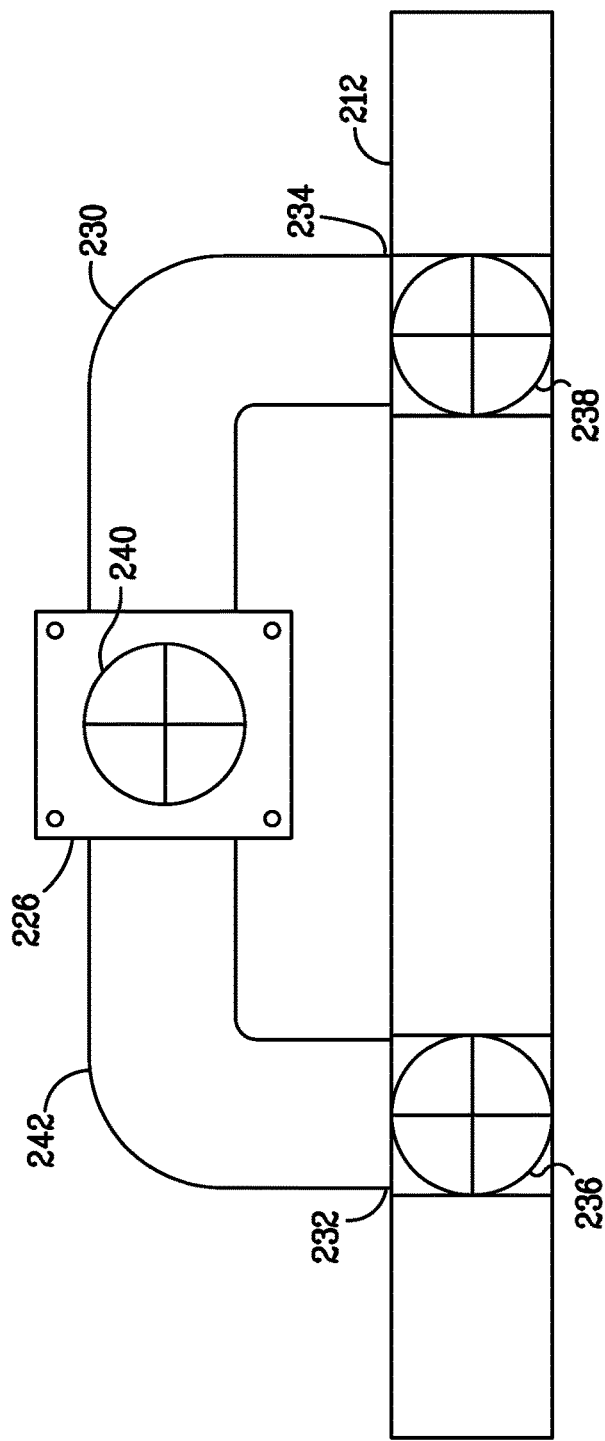
FIG. 3 presents a schematic illustration of a side stream configuration for use with the solid corrosion inhibitor of the present disclosure.

Referring now to FIG. 3, an alternate embodiment is shown that maintains the "piggablity" of a pipeline 212 or flowline (not shown). As shown, a bypass member 230 is installed, the bypass member 230 having an inlet end 232 and an outlet end 234. Inlet end 232 may be connected to inlet bypass valve 236 of pipeline 212 and outlet end 234 connected to outlet bypass valve 238 of pipeline 212. Inlet end 232 and outlet end 234 may be placed in fluid communication with pipeline 212 to form a side-stream section 242.

In the configuration of FIG. 3, one or more delivery ports 240 may be installed in the side-stream section 242 in order to achieve the level of corrosion inhibition at the outlet bypass valve 238 of pipeline 212. When the pipeline 212 is required to be pigged, the inlet bypass valve 236 and the outlet bypass valve 238 can be configured so as to halt flow to the side-stream section 242.

As described hereinabove for the embodiments of FIGS. 1 and 2, a solid formulation (not shown) comprising a corrosion inhibitor may be housed within a container of the type previously depicted, the container structured and arranged to permit the flow of fluids therethrough and confine the solid formulation. A module of the type previously depicted may be employed to position the container within a flowpath of the pipeline 212 or flowline. The module may be provided with a module mounting flange (not shown), which may be mounted to pipeline surface flange 226 of side-stream section 242.

Figure 4:
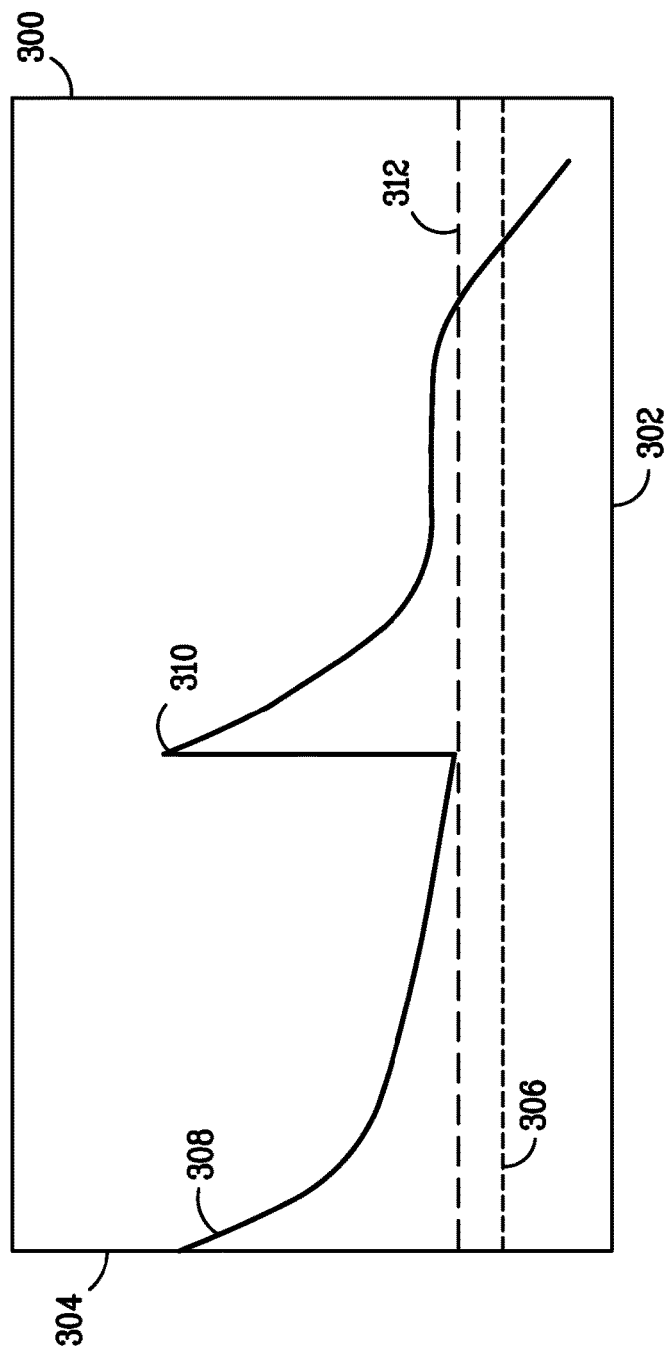
FIG. 4 presents a graphical comparison of inhibitor dosages for batch and continuous injection systems.

Referring now to FIG. 4, a graphical comparison of inhibitor dosages for batch and continuous injection systems 300 is presented. As mentioned, corrosion inhibitors may be introduced to pipelines and flowlines using continuous injection or through batch flow. In a continuous application, the inhibitor is continuously injected in small dosages into the pipeline or flowline Inhibitors are typically stored in tanks or vessels at the inlet of the pipeline and utilize a pump to meter and inject the chemical inhibitor.

In batch flow, the inhibitor chemical is delivered by a slug of a large volume of the chemical pushed through the line. Batches can be accomplished with the assistance of pigs. Fluid can either be pushed in front of a pig or transported between two pigs. The batches should be introduced at a pre-determined frequency in order to maintain sufficient amount of chemical at the pipe/fluid interface. Frequency of batch introduction is determined based on the liquid entry into pipe, the liquid holdup within the pipe, the size of slug catchers, the impact of the slug on facilities, slug size and pipeline inventory, and the amount of debris found in pig receiver.

In FIG. 4, time is represented by the x-axis, 302, increasing from left to right, and corrosion protection level is represented by the y-axis, 304, which increases from bottom to top. The minimum protection level is represented by horizontal line 306. As shown, in one form, corrosion inhibitor is introduced in two batches, 308 and 310. As may be appreciated, excess corrosion inhibitor must be introduced to avoid falling below the minimum protection level 306. Also as shown, the continuous introduction of corrosion inhibitor, represented by horizontal line 312, provides a sufficient level of protection without the periodic overdosing inherent in the batch approach.

Figure 5:
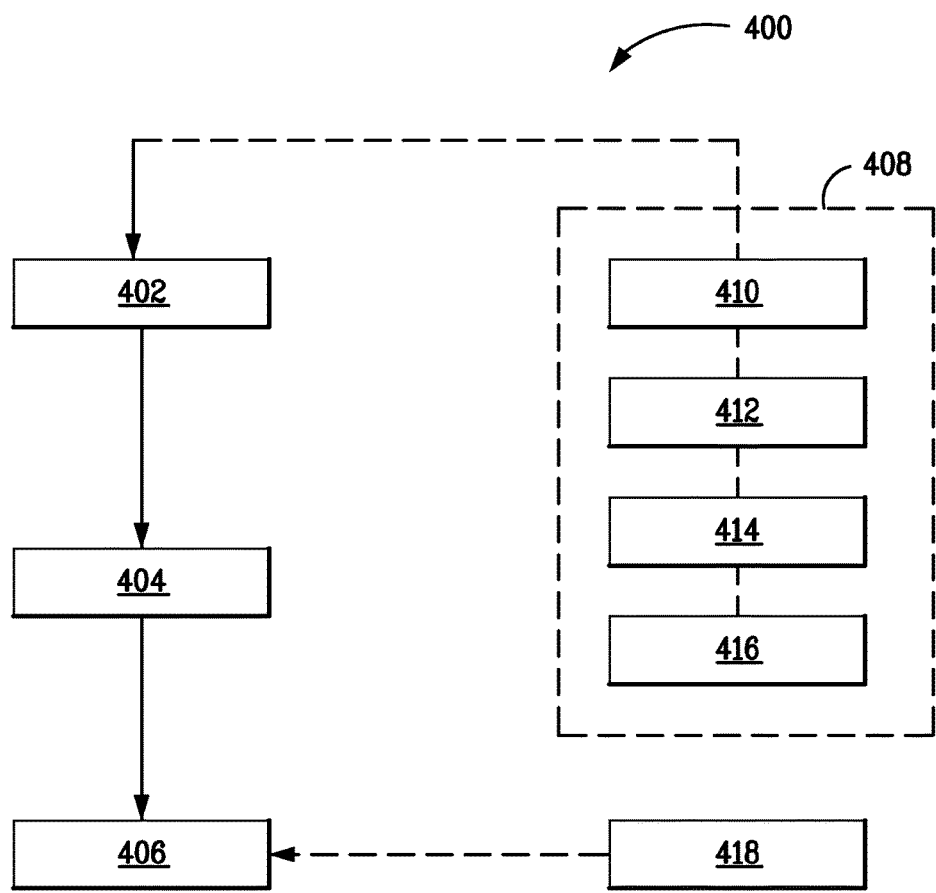
FIG. 5 presents a flow chart of a method of inhibiting the corrosion of pipelines and flowlines, in accordance with the present disclosure.

Referring now to FIG. 5, a flow chart of a method of inhibiting the corrosion of pipelines and flowlines is presented. As shown, the method of inhibiting the corrosion of pipelines and flowlines 400 includes, at block 402, installing a container having a solid formulation confined within, the solid formulation comprising a corrosion inhibitor, the container structured and arranged to permit the flow of fluids therethrough; at 404, placing the container within a flowpath of the pipeline or flowline at an axial position within the pipeline or flowline; and at 406, maintaining the axial position of the container along the pipeline or flowline.

Referring now to FIG. 5, in some embodiments, the method 400 further comprises at 408, forming a solid formulation by 410, preparing a composition comprising a binding agent and a corrosion inhibitor; at 412, mixing the composition; at 414, pouring the composition into a mold; and at 416, allowing the composition to solidify at ambient temperature to form the solid formulation. In some embodiments, maintaining the axial position of the container along the pipeline or flowline 406 includes 418, installing a module in the form of a pipeline valve body housing into the pipeline or flowline.

The embodiments disclosed herein, as illustratively described and exemplified hereinabove, have several beneficial and advantageous aspects, characteristics, and features. The embodiments disclosed herein successfully address and overcome shortcomings and limitations and widen the scope of currently known teachings with respect to pipeline or flowline corrosion inhibition.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, processes, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

The use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function.

INDUSTRIAL APPLICABILITY

The apparatus and methods disclosed herein are applicable to the oil and gas industry.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

What is claimed is:

1. A system for inhibiting the corrosion of oil and gas production pipelines and flowlines, the system comprising:
   (a) a solid formulation comprising a corrosion inhibitor, a binding agent to contain the corrosion inhibitor in a solid form, and one or more hydrate inhibitors;

(b) a container structured and arranged to permit the flow of oil and gas production fluids therethrough and confine the solid formulation; and (c) a module structured and arranged to position the container within a flowpath of the pipeline or flowline and maintain its axial position;

wherein the corrosion inhibitor is selected from amines, ammonium salts, amides, imidazolines, quaternary amines, esters, and mixtures thereof, based upon environmental conditions and water content of an oil and gas production stream.

2. The system of claim 1, wherein the corrosion inhibitor is effective over a temperature range of about −60° F. to about 200° F.

3. The system of claim 1, wherein the binding agent is selected from alkali metal salts, C16-C24 fatty alcohols, C16-C24 fatty alcohol ethoxylates, fatty acid alkanolamides, fatty acids, natural waxes and resins, high molecular weight polyethylene glycols, polyethylene waxes, mineral and petrolatum waxes, microcrystalline waxes, and mixtures thereof.

4. The system of claim 1, wherein the solid formulation is perforated to increase diffusivity.

5. The system of claim 1, wherein the container is in the form of a wire cage.

6. The system of claim 1, wherein the module is in the form of a pipeline valve body housing.

7. An apparatus for inhibiting the corrosion of oil and gas production pipelines and flowlines, comprising:

(a) a solid formulation comprising a corrosion inhibitor, a binding agent to contain the corrosion inhibitor in a solid form, and one or more hydrate inhibitors; and (b) a container structured and arranged to permit the flow of oil and gas production fluids therethrough and confine the solid formulation;

wherein the corrosion inhibitor is selected from amines, ammonium salts, amides, imidazolines, quaternary amines, esters, and mixtures thereof, based upon environmental conditions and water content of an oil and gas production stream.

8. The apparatus of claim 7, wherein the corrosion inhibitor is functional over a temperature range of about −60° F. to about 200° F.

9. The apparatus of claim 7, wherein the binding agent is selected from alkali metal salts, C16-C24 fatty alcohols, C16-C24 fatty alcohol ethoxylates, fatty acid alkanolamides, fatty acids, natural waxes and resins, high molecular weight polyethylene glycols, polyethylene waxes, mineral and petrolatum waxes, microcrystalline waxes, and mixtures thereof.

10. The apparatus of claim 7, wherein the solid formulation is perforated to increase diffusivity.

11. The apparatus of claim 7, wherein the container is in the form of a wire cage.

12. The apparatus of claim 7, further comprising a module in the form of a pipeline valve body housing for maintaining the axial position of the container along the pipeline or flowline.

* * * * *